US007295913B2

(12) United States Patent
Matsuda et al.

(10) Patent No.: US 7,295,913 B2
(45) Date of Patent: Nov. 13, 2007

(54) ENGINE CONTROL APPARATUS FOR MOTORCYCLE AND MOTORCYCLE

(75) Inventors: Takeshi Matsuda, Shizuoka (JP); Hidenori Akatsuka, Shizuoka (JP); Daichi Noborio, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 0 days.

(21) Appl. No.: 11/468,232

(22) Filed: Aug. 29, 2006

(65) Prior Publication Data

US 2007/0050122 A1 Mar. 1, 2007

(30) Foreign Application Priority Data

Aug. 30, 2005 (JP) ............................. 2005-249414
Jun. 28, 2006 (JP) ............................. 2006-178775

(51) Int. Cl.
*G06F 19/00* (2006.01)
*G06F 7/00* (2006.01)
*F02D 41/22* (2006.01)

(52) U.S. Cl. ....................... 701/103; 701/114; 123/479

(58) Field of Classification Search ................ 701/103, 701/102, 114, 115; 123/478, 479, 480, 361, 123/399

See application file for complete search history.

(56) References Cited

FOREIGN PATENT DOCUMENTS

| | | | | |
|---|---|---|---|---|
| JP | 10-82340 | A | * | 3/1998 |
| JP | 2000-303900 | A | * | 10/2000 |
| JP | 2002-256895 | | | 9/2002 |
| JP | 2002-371897 | | | 12/2002 |
| JP | 2005-207260 | A | * | 8/2005 |

* cited by examiner

*Primary Examiner*—Hieu T. Vo
(74) *Attorney, Agent, or Firm*—Hogan & Hartson LLP

(57) ABSTRACT

An engine control apparatus for a motorcycle capable of detecting an abnormality such that there is no change in vehicle behavior even when the abnormality is brought about. A control CPU controls injection and ignition of an engine and a throttle valve. A monitor CPU detects an abnormality of the engine control apparatus. The control CPU calculates a fuel injection amount, an ignition timing, and an opening degree of the throttle valve necessary for controlling the engine and executes a predetermined engine control. The monitor CPU detects the abnormality of the engine control apparatus. A comparison of control values to detect the abnormality by the monitor CPU is executed by a detection interval equal to or smaller than 10 ms.

9 Claims, 5 Drawing Sheets

[Fig. 1]
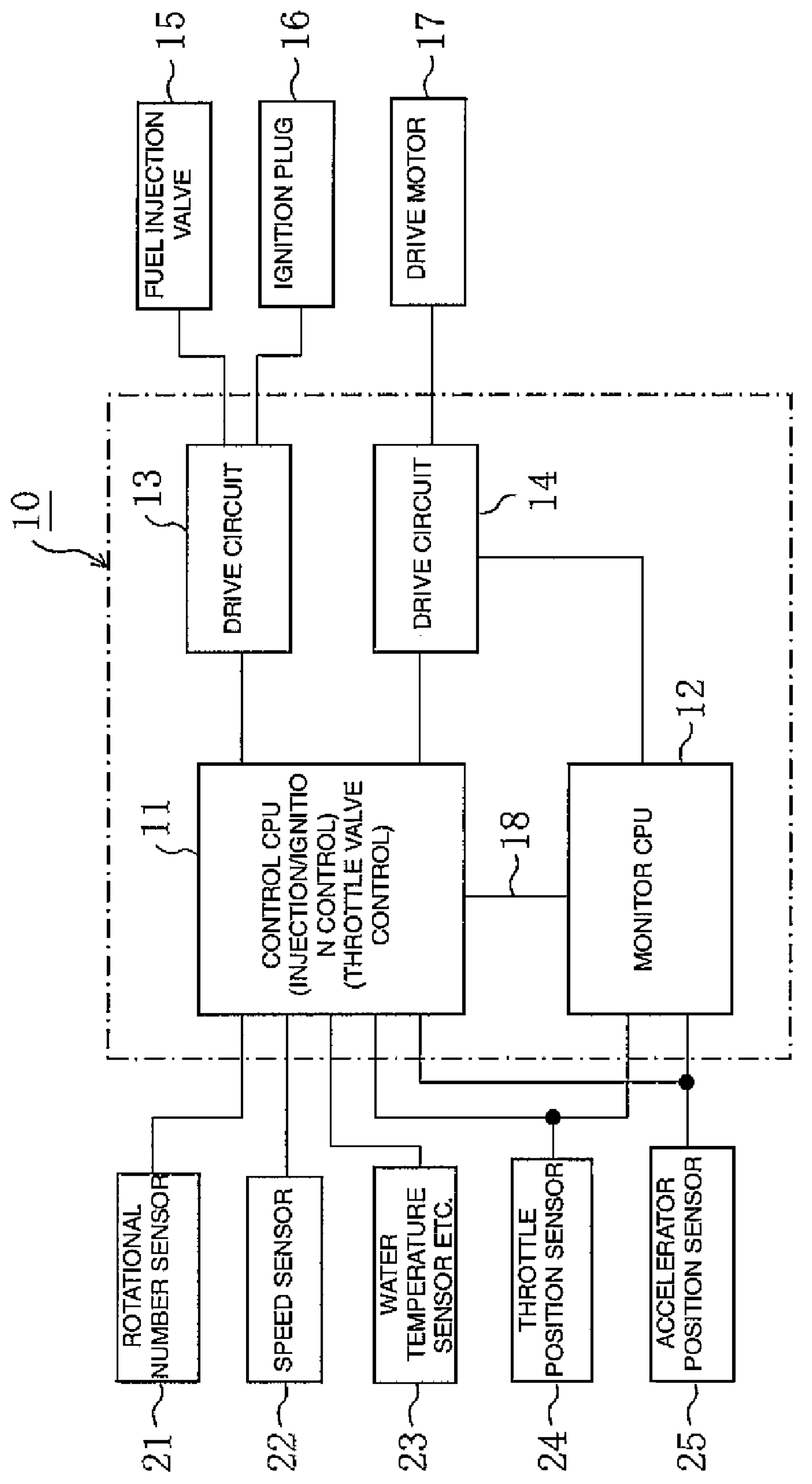

[Fig. 2]
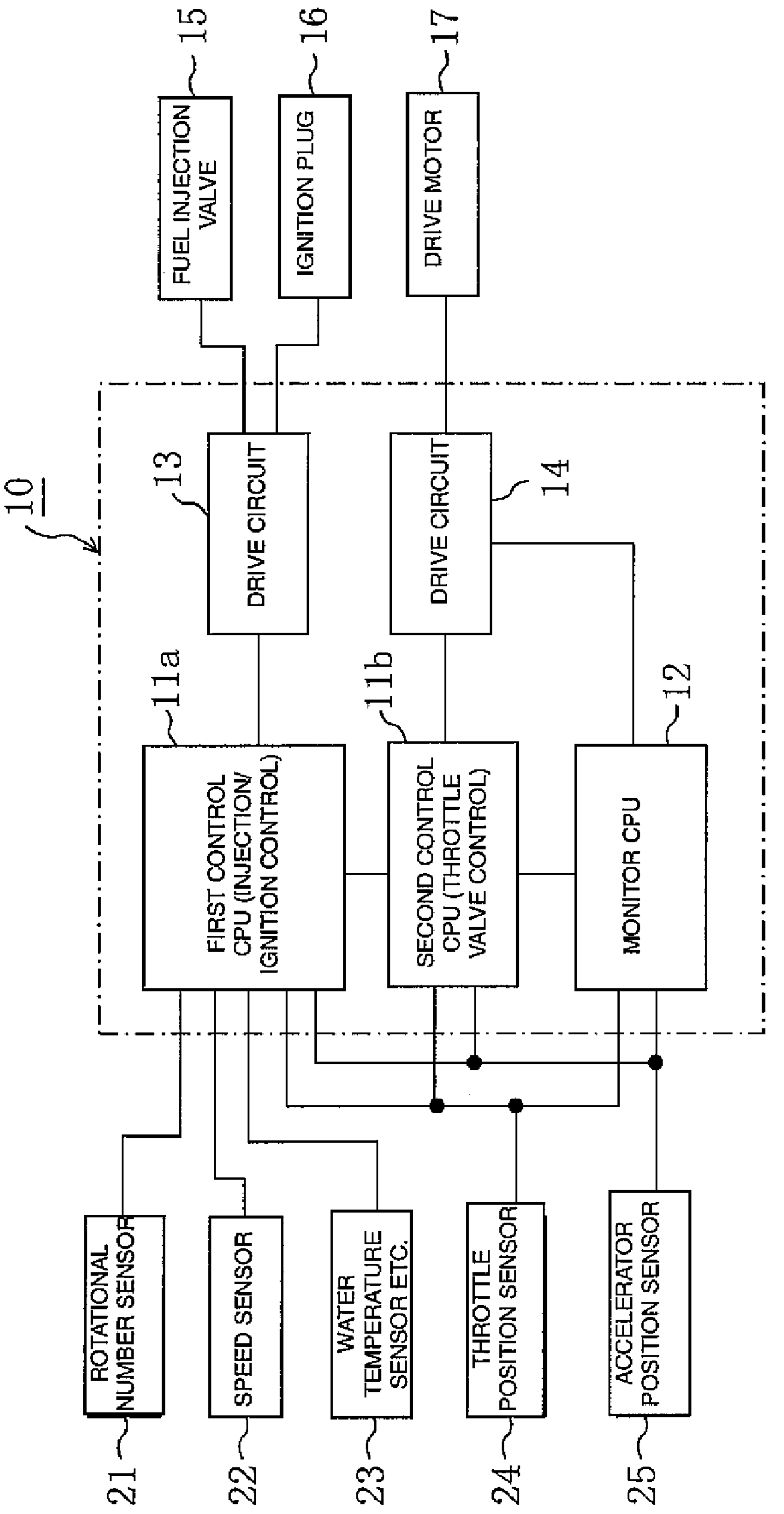

[Fig. 3]
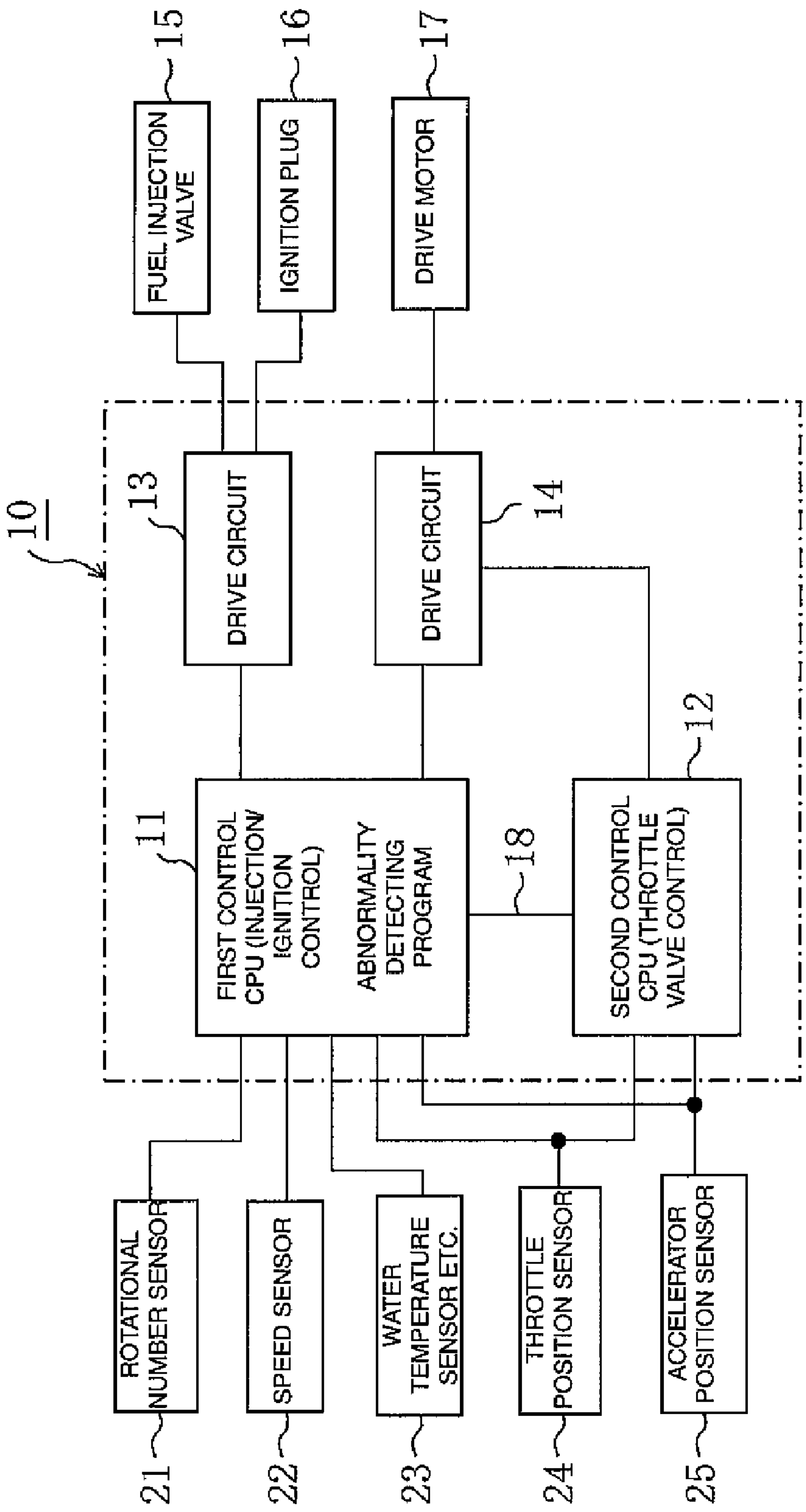

[Fig. 4]
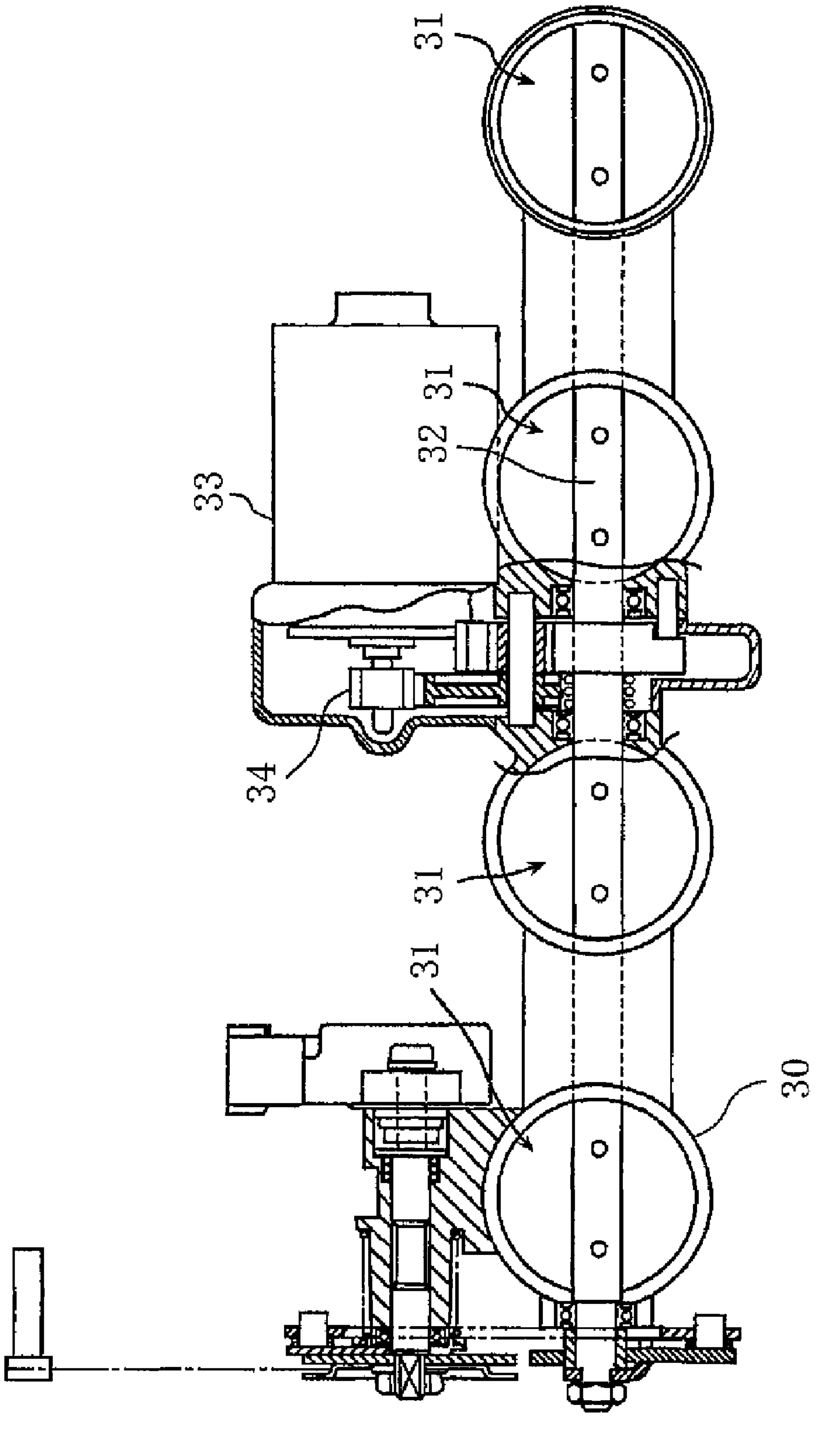

[Fig. 5]
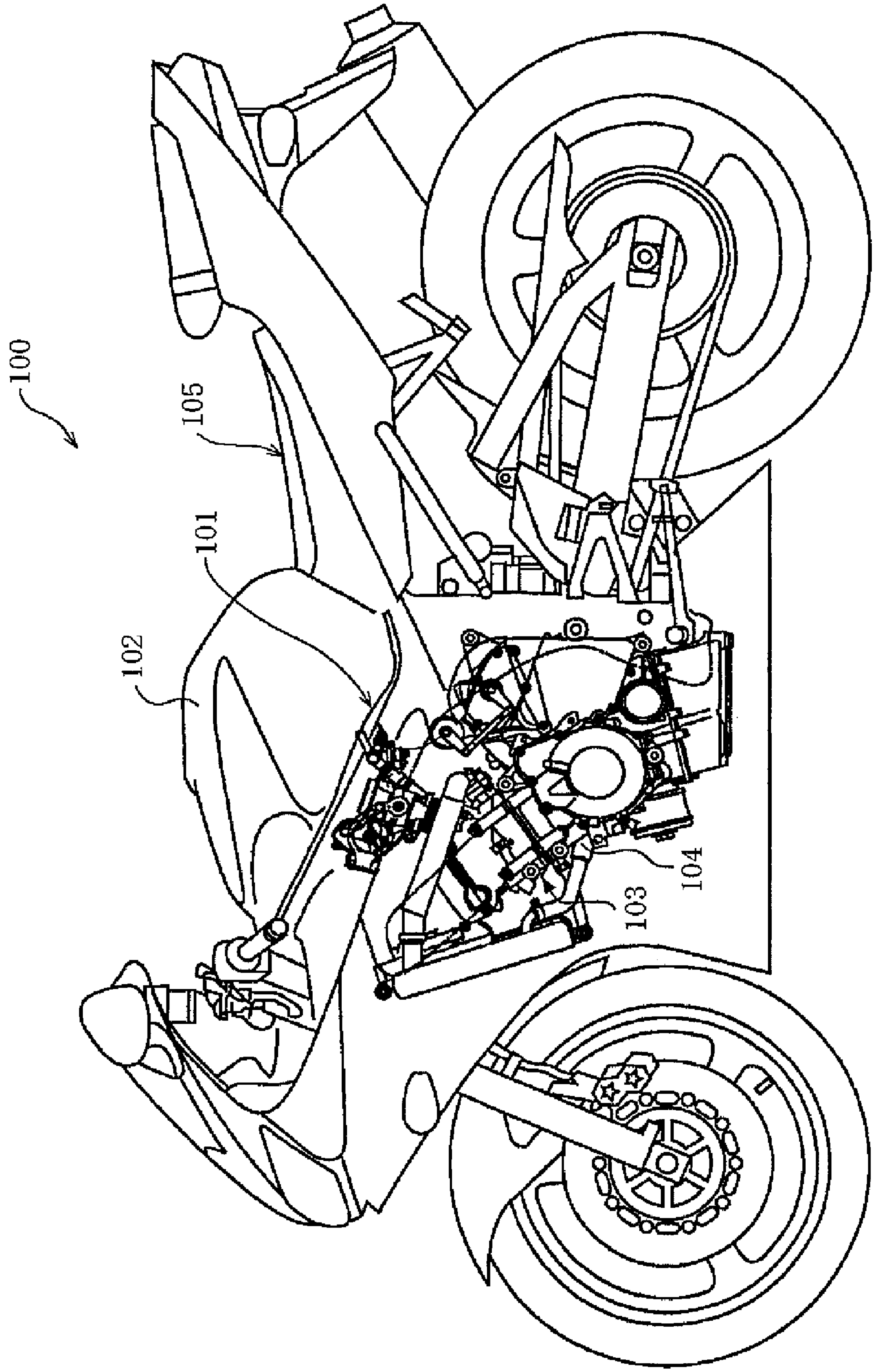

ENGINE CONTROL APPARATUS FOR MOTORCYCLE AND MOTORCYCLE

RELATED APPLICATIONS

This application claims the benefit of priority under 35 USC 119 of Japanese patent application nos. 2005-249414, filed on Aug. 30, 2005, and 2006-178775, filed on Jun. 28, 2006, which applications are hereby incorporated by reference in their entireties.

BACKGROUND OF THE INVENTION

1. Field of the Invention

The present invention relates to an engine control apparatus for a motorcycle, and particularly relates to an engine control apparatus capable of detecting an abnormality of the control apparatus.

2. Description of Related Art

An electronic throttle valve controls an opening degree of a throttle valve by an electronic control to control an intake amount of an engine (internal combustion engine) to realize low emission gas and low fuel cost. Such a construction is already adopted in portions of passenger vehicles.

In adopting an electronic throttle valve for a motorcycle, a drive motor for controlling an opening degree of the throttle valve needs to be arranged compactly while avoiding interference with a fuel injection valve arranged at an intake path. Therefore, although a compact electronic throttle control apparatus mountable to a motorcycle is proposed in prior art such as JP-A-2002-256895, an electronic throttle control apparatus has not been adopted yet in motorcycles due to their inherent restrictions.

On the other hand, an electronic throttle control mounted to an automobile executes a system control by CPU (Central Processing Unit) and detects an abnormality of the system in combination with a drive control of an engine (ignition control, fuel injection control or the like).

Generally, detection of an abnormality of a system is executed by constituting a CPU as a double system and comparing control values calculated by using the same data. See, for example, JP-A-2002-371897.

Even when an engine control apparatus for an automobile such as that disclosed in JP-A-2002-371897 is applied to a motorcycle, there is a possibility of great vehicle behavior changes during system abnormality.

SUMMARY OF THE INVENTION

The present invention provides an engine control apparatus for a motorcycle that does not cause a change in vehicle behavior even when an abnormality is brought about in the engine control apparatus.

An engine control apparatus for a motorcycle according to one embodiment of the invention includes a control CPU for controlling fuel injection and ignition and a throttle valve. A monitor CPU detects an abnormality of the control CPU. The monitor CPU calculates a control value with regard to control of the throttle valve and detects the abnormality of the control CPU by comparing the control value with a control value with regard to the control of the throttle valve calculated by the control CPU by a detection interval equal to or smaller than 10 ms.

In one embodiment, the detection interval of the monitor CPU has a length to a degree the same as an interval of calculating the control value with regard to the control of the throttle valve in the control CPU.

In one embodiment, the control value with regard to the control of the throttle valve calculated by the control CPU is transmitted to the monitor CPU by a communication interval equal to or smaller than 10 ms.

In one embodiment, a signal of a throttle position sensor for detecting a position of the throttle valve, and a signal of an accelerator position sensor for detecting a position of an accelerator operator are branched to be inputted to the control CPU and the monitor CPU.

In one embodiment, the control CPU comprises a first control CPU for controlling fuel injection and ignition, and a second control CPU for controlling the throttle valve.

An engine control apparatus for a motorcycle according to another embodiment of the invention includes a first control CPU for controlling fuel injection and ignition, and a second control CPU for controlling a throttle valve. The first control CPU includes an abnormality detecting program for detecting an abnormality of the control of the throttle valve. The abnormality detecting program calculates a control value with regard to control of the throttle valve and detects the abnormality of the control of the throttle valve by comparing the control value with a control value with regard to control of the throttle valve calculated by the second control CPU by a detection interval equal to or smaller than 10 ms.

In one embodiment, a signal of a throttle position sensor for detecting a position of the throttle valve and a signal of an accelerator position sensor for detecting a position of an accelerator operator are branched to be inputted to the first control CPU and the second control CPU.

A motorcycle of the invention is mounted with the engine control apparatus.

The engine control apparatus for a motorcycle according to the invention detects abnormality of the engine control apparatus by comparing a control value with regard to control of the throttle valve calculated by a monitor CPU with a control value with regard to control of the throttle valve calculated by a control CPU by a detection interval equal to or smaller than 10 ms. Therefore, a change in vehicle behavior by the abnormality of the engine control apparatus is restrained.

Other features and advantages of the invention will be apparent from the following detailed description, taken in conjunction with the accompanying drawings which illustrate, by way of example, various features of embodiments of the invention.

BRIEF DESCRIPTION OF THE DRAWINGS

FIG. 1 is a block diagram of an engine control apparatus for a motorcycle according to a first embodiment of the invention.

FIG. 2 is a block diagram of an engine control apparatus for a motorcycle according to a second embodiment of the invention.

FIG. 3 is another block diagram of the engine control apparatus of the second embodiment.

FIG. 4 is a view of an electronic throttle mechanism mounted to a motorcycle according to the invention.

FIG. 5 is a view of a motorcycle mounted with the engine control apparatus according to the invention.

DETAILED DESCRIPTION OF THE INVENTION

The present inventors found that when an engine control apparatus for an automobile is applied to a motorcycle, there is a possibility of bringing about a change in a behavior of a vehicle during system abnormality. This is because a motorcycle has a lighter weight than that of an automobile and is mounted with a high rotation type engine. Due to such differences in vehicle characteristics, there are problems specific to a motorcycle. Moreover, the inventors found that decreasing the time from actual occurrence of an abnormality to detection of the abnormality suppresses the change in behavior of the motorcycle. Thus, the inventors invented a control apparatus that shortens the time for detecting an abnormality by comparing a control value calculated by a monitor CPU and a control value calculated by a control CPU within a detection interval equal to or smaller than 10 ms. The control values are compared within a detection interval equal to or smaller than 10 ms in at least a part of the required operating region. Of course, the comparison may also be performed in the entire operating region. The operating region is defined by appropriately dividing in accordance with an engine load, an engine rotational number or the like.

Embodiments of the invention are described with reference to the drawings. In the drawings, elements having substantially the same functions are designated by the same reference notations. The invention is not limited to the following embodiments.

EMBODIMENT 1

FIG. 1 is a block diagram of an engine control apparatus 10 for a motorcycle according to a first embodiment of the invention.

As shown by FIG. 1, engine control apparatus 10 includes a control CPU 11 for controlling fuel injection and ignition control of an engine and a throttle valve, and a monitor CPU 12 for detecting an abnormality of engine control apparatus 10.

Control CPU 11 is inputted with sensor signals of an engine rotational number sensor 21, a speed sensor 22, a water temperature sensor 23, a throttle position sensor 24, an accelerator position sensor 25 and the like. A fuel injection amount, an ignition timing, an opening degree of a throttle valve and the like necessary for controlling an engine are calculated and control signals therefor are outputted. The control signals are inputted to a drive circuit 13 for driving a fuel injection valve 15 and an ignition plug 16 and a drive circuit 14 for driving a drive motor 17 of the throttle valve to thereby execute predetermined engine control.

The monitor CPU 12 detects an abnormality of the control CPU 11 by calculating a control value with regard to control of the throttle valve (for example, throttle opening degree), and comparing the control value with a control value with regard to the control of the throttle valve calculated by control CPU 11 using the same data. When an abnormality is detected, a fail signal is outputted from monitor CPU 12 to drive circuit 14 to execute, for example, cutting the drive of the throttle valve.

One characteristic of the invention is to compare the control value with regard to the control of the throttle valve calculated by the monitor CPU 12 and the control value with regard to the control of the throttle valve calculated by the control CPU by a detection interval equal to or smaller than 10 ms.

That is, by controlling the abnormality of the control CPU 11 by such a short detection interval, a change in a behavior of a vehicle by the abnormality of the engine control apparatus 10 is restrained.

For that purpose, it is preferable to branch a signal of the throttle position sensor for detecting a position of the throttle valve and the signal of the accelerator position sensor for detecting a position of an accelerator operator operated by a rider to be directly inputted to the control CPU 11 and the monitor CPU 12.

Further, by constituting the detection interval of the monitor CPU 12 by a length to a degree the same as an interval of calculating the control value with regard to the control of the throttle valve in the control of the CPU 11, a change in a behavior of the vehicle by the abnormality of the engine control apparatus 10 is further restrained.

Further, it is preferable that the control value with regard to the control of the throttle valve calculated by the control CPU 11 is transmitted to the monitor CPU 12 by a communication interval equal to or smaller than 10 ms. When the calculated value is transmitted to monitor CPU 12 in accordance with the interval of calculating the control value by control CPU 11, the abnormality can be detected by a speed equal to or smaller than 10 ms and the change in the behavior of the vehicle by the abnormality of the engine control apparatus 10 is further restrained.

EMBODIMENT 2

FIG. 2 is a block diagram of an engine control apparatus 10 for a motorcycle according to a second embodiment of the invention. Although the basic constitution is the same as that shown by FIG. 1, the constitution differs in that control CPU 11 is constituted by a first control CPU 11*a* for executing the fuel injection and the ignition control and a second control CPU 11*b* for executing control of the throttle valve.

According to the second embodiment, monitor CPU 12 calculates a control value with regard to control of the throttle valve (for example, throttle opening degree) and detects an abnormality of second control CPU 11*b* by comparing the control value with the control value with regard to the control of the throttle valve calculated by second control CPU 11*b* using the same data. Further, when the abnormality is detected, a fail signal is outputted from monitor CPU 12 to drive circuit 14 and, for example, cutting the drive of the throttle valve is executed.

Thus, as in the first embodiment, the control value with regard to the control of the throttle valve calculated by monitor CPU 12 is compared with the control value with regard to the control of the throttle valve calculated by control CPU 11 by the detection interval equal to or smaller than 10 ms.

FIG. 3 is a block diagram with the function of monitor CPU 12 shown in FIG. 2 provided in first control CPU 11*a* for executing injection and ignition control.

That is, the first control CPU 11*a* includes an abnormality detecting program for detecting the abnormality of the control of the throttle valve, the abnormality detecting program calculates a control value with regard to the control of the throttle valve and detects the abnormality of the control of the throttle valve by comparing the control value with a control value with regard to the control of the throttle valve calculated by the second control CPU 11*b*. When the abnormality is detected, the fail signal is outputted from first control CPU 11*a* to drive circuit 14 and, for example, cutting the drive to the throttle valve is executed.

Also in this case, the control value with regard to the control of the throttle valve calculated by executing the abnormality detecting program in the first control CPU 11*a* is compared with the control value with regard to the control of the throttle valve calculated by the second control CPU 11*b* by the detection interval equal to or smaller than 10 ms.

Further, the signal of the throttle position sensor for detecting the position of the throttle valve necessary for calculating the control value with regard to the control of the throttle valve and the signal of the accelerator position sensor for detecting the position of the accelerator operator operated by the rider are inputted directly not only to the second control CPU 12 but also to the first control CPU 11*a*.

FIG. 4 shows an electronic throttle mechanism mounted to a motorcycle. A throttle body 30 is constituted by a cylindrical shape, a throttle valve 31 is fixed to one piece of common valve shaft 32 arranged to penetrate all of the throttle bodies 30. A drive motor 33 is arranged such that a rotating shaft thereof is in parallel with valve shaft 32 and valve shaft 32 is driven to rotate by a plurality of gears 34 in rotating the drive motor 43.

Throttle valves 31 mounted to the motorcycle are provided to respective cylinders (a single throttle valve in a general automobile) and therefore, in controlling the opening degree of throttle valve 31, a response of the engine is faster than that of the automobile. Therefore, when abnormality detection is slow, there is a concern of causing a change in vehicle behavior by the abnormality of the engine control apparatus before detecting the abnormality, however, when engine control apparatus 10 of the invention is used, a significant change in vehicle behavior is not felt by the rider.

Further, although there is an intake valve provided at a combustion chamber of the engine serving also a function of the throttle valve, also in an electronic throttle mechanism of such a type, an effect of the invention is naturally achieved.

FIG. 5 shows a motorcycle 100 mounted with engine control apparatus 10. A fuel tank 102 is provided above a tank rail 101 and an engine unit 103 is arranged therebelow. Engine unit 103 functions as a power source for water cooling type 4 cycle parallel 4 cylinders and the engine control apparatus (not illustrated) is mounted below a seat 105.

The invention is not limited to the described embodiments. The invention may also be applied to other types of vehicles such as motorbikes, scooters, three-wheeled vehicles, four-wheeled vehicles, all terrain vehicles (ATVs), snow mobiles and so on.

According to the invention, an engine control apparatus for a motorcycle is provided that is capable of restraining change in vehicle behavior even when an abnormality is brought about in the engine control apparatus.

The particular embodiments of the invention described in this document should be considered illustrative, rather than restrictive. Modification to the described embodiments may be made without departing from the spirit of the invention as defined by the following claims.

The invention claimed is:

1. An engine control apparatus for a motorcycle comprising:

a control CPU for controlling fuel injection and ignition and a throttle valve; and a monitor CPU for detecting an abnormality of the control CPU, wherein the monitor CPU calculates a control value with regard to control of the throttle valve and detects the abnormality of the control CPU by comparing the control value with a control value with regard to the control of the throttle valve calculated by the control CPU by a detection interval equal to or smaller than 10 ms.

2. The engine control apparatus according to claim 1, wherein the detection interval of the monitor CPU has a length to a degree the same as an interval of calculating the control value with regard to the control of the throttle valve in the control CPU.

3. The engine control apparatus according to claim 1, wherein the control value with regard to the control of the throttle valve calculated by the control CPU is transmitted to the monitor CPU by a communication interval equal to or smaller than 10 ms.

4. The engine control apparatus according to claim 1, wherein a signal of a throttle position sensor for detecting a position of the throttle valve, and a signal of an accelerator position sensor for detecting a position of an accelerator operator are branched to be inputted to the control CPU and the monitor CPU.

5. The engine control apparatus according to claim 1, wherein the control CPU comprises a first control CPU for controlling the fuel injection and ignition, and a second control CPU for controlling the throttle valve.

6. A motorcycle mounted with the engine control apparatus according to claim 1.

7. An engine control apparatus for a motorcycle comprising:

a first control CPU for controlling fuel injection and ignition; and a second control CPU for controlling a throttle valve, wherein the first control CPU includes an abnormality detecting program for detecting an abnormality of the control of the throttle valve, and wherein the abnormality detecting program calculates a control value with regard to control of the throttle valve and detects the abnormality of the control of the throttle valve by comparing the control value with a control value with regard to the control of the throttle valve calculated by the second control CPU by a detection interval equal to or smaller than 10 ms.

8. The engine control apparatus according to claim 7, wherein a signal of a throttle position sensor for detecting a position of the throttle valve and a signal of an accelerator position sensor for detecting a position of an accelerator operator are branched to be inputted to the first control CPU and the second control CPU.

9. A motorcycle mounted with the engine control apparatus according to claim 7.

* * * * *